(12) United States Patent
Kondapally et al.

(10) Patent No.: US 12,515,712 B2
(45) Date of Patent: Jan. 6, 2026

(54) INFORMATION PROCESSING APPARATUS, CONTROL APPARATUS FOR MOVING BODY, METHOD OF CONTROLLING INFORMATION PROCESSING APPARATUS, AND METHOD OF CONTROLLING MOVING BODY

(71) Applicant: HONDA MOTOR CO., LTD., Tokyo (JP)

(72) Inventors: Anirudh Reddy Kondapally, Wako (JP); Kentaro Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 703 days.

(21) Appl. No.: 17/703,648

(22) Filed: Mar. 24, 2022

(65) Prior Publication Data
US 2022/0315062 A1   Oct. 6, 2022

(30) Foreign Application Priority Data

Mar. 30, 2021   (JP) ................. 2021-058445

(51) Int. Cl.
*B60W 60/00* (2020.01)
*G06V 20/56* (2022.01)
(Continued)

(52) U.S. Cl.
CPC ....... *B60W 60/00253* (2020.02); *G06V 20/56* (2022.01); *G06V 20/64* (2022.01);
(Continued)

(58) Field of Classification Search
CPC ....... B60W 60/00253; B60W 2300/34; B60W 2420/403; B60W 2540/041;
(Continued)

(56) References Cited

U.S. PATENT DOCUMENTS 8,831,957 B2   9/2014   Taubman et al.
10,832,064 B2   11/2020   Hirai
(Continued)

FOREIGN PATENT DOCUMENTS

CN   104509079 A   4/2015
JP   2013-088906 A   5/2013
(Continued)

OTHER PUBLICATIONS

Japanese Office Action for Japanese Patent Application No. 2021058445 mailed May 7, 2024 (partially translated).
(Continued)

*Primary Examiner* — Rachid Bendidi
*Assistant Examiner* — Hossam M Abd El Latif
(74) *Attorney, Agent, or Firm* — Thomas | Horstemeyer, LLP

(57) ABSTRACT

An information processing apparatus that estimates an instruction position for a moving body used by a user acquires utterance information regarding the instruction position including a visual mark from a communication device used by the user. The information processing apparatus acquires a captured image captured by the moving body and determines an object region in the captured image corresponding to the visual mark included in the utterance information. The information apparatus estimates the instruction position based on the object region.

11 Claims, 10 Drawing Sheets

(51) Int. Cl.
*G06V 20/58* (2022.01)
*G06V 20/64* (2022.01)
*G10L 15/16* (2006.01)
*G10L 15/22* (2006.01)

(52) U.S. Cl.
CPC .............. *G10L 15/16* (2013.01); *G10L 15/22* (2013.01); *B60W 2300/34* (2013.01); *B60W 2420/403* (2013.01); *B60W 2540/041* (2020.02); *B60W 2540/21* (2020.02); *G06V 2201/07* (2022.01); *G10L 2015/228* (2013.01)

(58) Field of Classification Search
CPC .... B60W 2540/21; G10L 15/16; G10L 15/22; G10L 2015/228; G06V 20/56; G06V 20/64; G06V 2201/07; G06V 20/58
USPC .......................................................... 701/23
See application file for complete search history.

(56) References Cited

U.S. PATENT DOCUMENTS

| | | | |
|---|---|---|---|
| 11,648,964 B2 | 5/2023 | Uehara et al. | |
| 11,756,289 B2 | 9/2023 | Takata et al. | |
| 11,912,309 B2 | 2/2024 | Uehara et al. | |
| 2014/0289323 A1 | 9/2014 | Kutaragi et al. | |
| 2015/0032260 A1* | 1/2015 | Yoon ................... | G05D 1/6486 700/257 |
| 2016/0379121 A1* | 12/2016 | Ge ........................ | H04W 4/029 706/46 |
| 2019/0128694 A1* | 5/2019 | Matsushita ............. | G10L 13/00 |
| 2020/0104613 A1 | 4/2020 | Hirai | |
| 2020/0143458 A1 | 5/2020 | Ikeda et al. | |
| 2020/0257498 A1 | 8/2020 | Takata et al. | |
| 2020/0262454 A1* | 8/2020 | Uehara ................ | G05D 1/0276 |
| 2022/0107200 A1* | 4/2022 | Sato .................... | G01C 21/3629 |
| 2022/0295017 A1* | 9/2022 | Shimotani ................ | G06T 7/00 |
| 2023/0119887 A1 | 4/2023 | Uehara et al. | |

FOREIGN PATENT DOCUMENTS

| | | |
|---|---|---|
| JP | 2017-176305 A | 10/2017 |
| JP | 2020-038071 A | 3/2020 |
| JP | 2020-057081 A | 4/2020 |
| JP | 2020-077035 A | 5/2020 |
| JP | 2020-129296 A | 8/2020 |
| JP | 2020-135113 A | 8/2020 |

OTHER PUBLICATIONS

Chinese Office Action for Chinese Patent Application No. 202210288113.0 mailed Aug. 19, 2025 (partially translated).

* cited by examiner

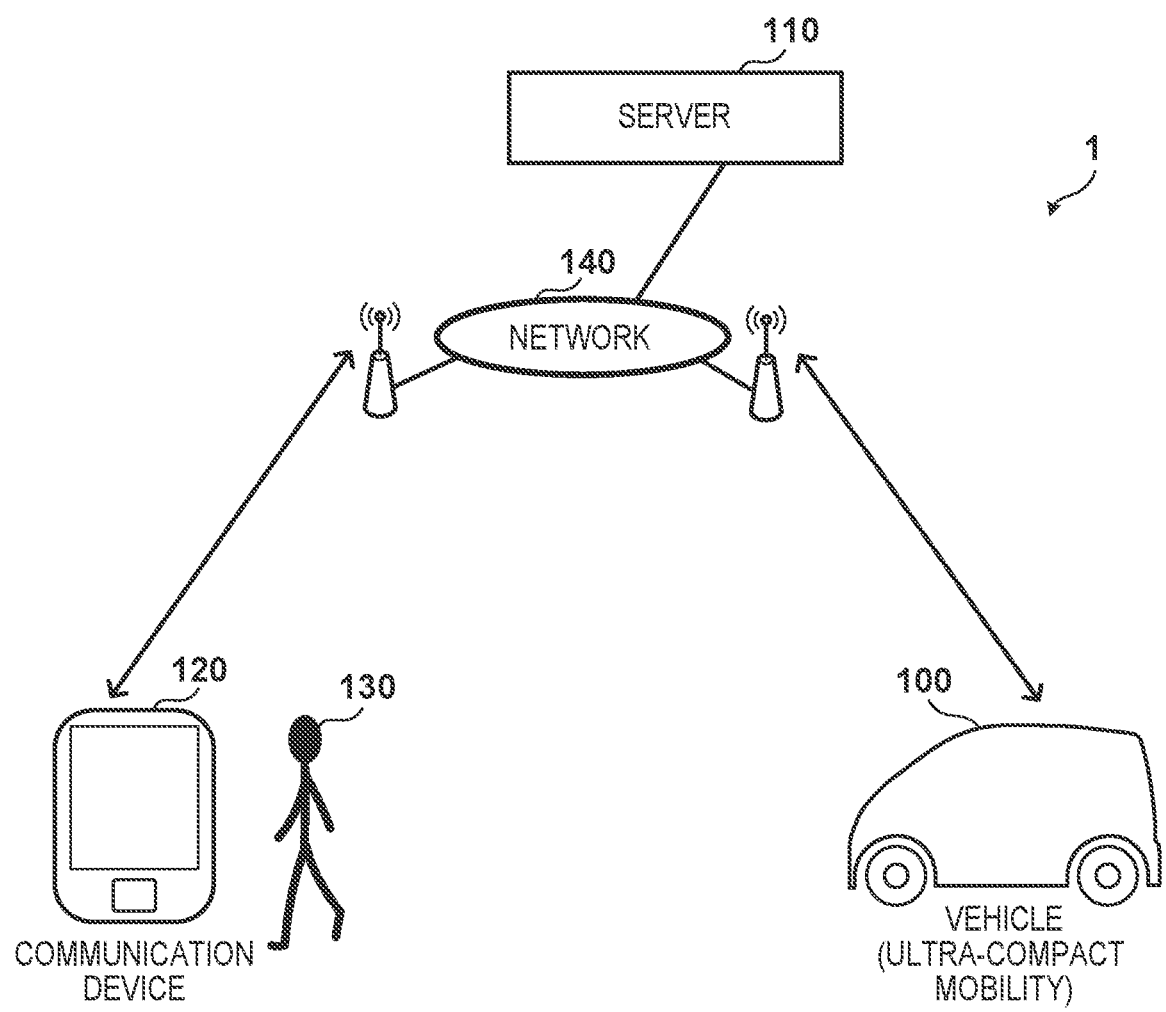

INFORMATION PROCESSING APPARATUS, CONTROL APPARATUS FOR MOVING BODY, METHOD OF CONTROLLING INFORMATION PROCESSING APPARATUS, AND METHOD OF CONTROLLING MOVING BODY

CROSS-REFERENCE TO RELATED APPLICATION(S)

This application claims priority to and the benefit of Japanese Patent Application No. 2021-058445 filed on Mar. 30, 2021, the entire disclosure of which is incorporated herein by reference.

BACKGROUND OF THE INVENTION

Field of the Invention

The present invention relates to an information processing apparatus, a control apparatus for a moving body, a method of controlling an information processing apparatus, and a method of controlling a moving body.

Description of the Related Art

In recent years, an electric moving body called ultra-compact mobility (also referred to as micro mobility) and having a riding capacity of about one to two persons has been known, and is expected to spread as an easy mode of transportation.

A car sharing system using such ultra-compact mobility for sharing has been proposed (Japanese Patent Laid-Open No. 2020-77035). In this car sharing system, a vehicle management server receives a use application message, including a use start time and a renting place of a vehicle for car sharing, from a communication device of a user. Then, based on a content of the use application message and a current position of a transport vehicle, the transport vehicle that can arrive at the renting place by the use start time is specified, and the specified transport vehicle is caused to transport a sharing car to the renting place. The user can use the sharing car when visiting the renting place at a designated use start time.

By the way, in a case where the user uses the ultra-compact mobility, such a use case is conceivable in which the user does not visit the renting place where the ultra-compact mobility is parked but the ultra-compact mobility and the user dynamically adjust a meeting position while each moving. Such a use case is effective in a case where it is difficult to meet at a previously designated position due to congestion or the like, a case where the user first designates a rough area, a building, or the like, and adjusts a specific meeting position at a stage when they arrive closer to each other, and other cases. Alternatively, in a case where the ultra-compact mobility already exists around the user, for example, a use case of moving the ultra-compact mobility according to the user's intention, like a standby instruction such as "wait next to the post box there", is also conceivable. In these use cases, if a position intended by the user is estimated from an utterance uttered by the user and the ultra-compact mobility moves to the position, the user can handle the ultra-compact mobility more easily.

SUMMARY OF THE INVENTION

The present invention has been made in view of the above problems, and an object thereof is to realize a technique capable of estimating an instruction position for a moving body from utterance information of a user who uses the moving body.

In order to solve the aforementioned issues, one aspect of the present disclosure provides an information processing apparatus that estimates an instruction position for a moving body used by a user, the information processing apparatus comprising: an utterance acquisition unit configured to acquire utterance information regarding the instruction position including a visual mark from a communication device used by the user; an image acquisition unit configured to acquire a captured image captured by the moving body; a determination unit configured to determine an object region in the captured image corresponding to the visual mark included in the utterance information; and an estimation unit configured to estimate the instruction position based on the object region determined by the determination unit.

Another aspect of the present disclosure provides a method of controlling an information processing apparatus that estimates an instruction position for a moving body used by a user, the method comprising: acquiring utterance information regarding the instruction position including a visual mark from a communication device used by the user; acquiring a captured image captured by the moving body; determining an object region in the captured image corresponding to the visual mark included in the utterance information; and estimating the instruction position based on the object region determined in the determining.

Still another aspect of the present disclosure provides a control apparatus for a moving body that estimates an instruction position for a moving body used by a user, the control apparatus comprising: an utterance acquisition unit configured to acquire utterance information regarding the instruction position including a visual mark from a communication device used by the user; an image acquisition unit configured to acquire a captured image captured by the moving body; a determination unit configured to determine an object region in the captured image corresponding to the visual mark included in the utterance information; and an estimation unit configured to estimate the instruction position based on the object region determined by the determination unit.

Still yet another aspect of the present disclosure provides a method of controlling a moving body that estimates an instruction position for a moving body used by a user, the method comprising: acquiring utterance information regarding the instruction position including a visual mark from a communication device used by the user; acquiring a captured image captured by the moving body; determining an object region in the captured image corresponding to the visual mark included in the utterance information; and estimating the instruction position based on the object region determined in the determining.

According to the present invention, it is possible to estimate an instruction position for a moving body from utterance information of a user who uses the moving body.

BRIEF DESCRIPTION OF THE DRAWINGS

FIG. 1 is a diagram showing an example of an information processing system according to an embodiment of the present invention;

DESCRIPTION OF THE EMBODIMENTS

Figure 2A:
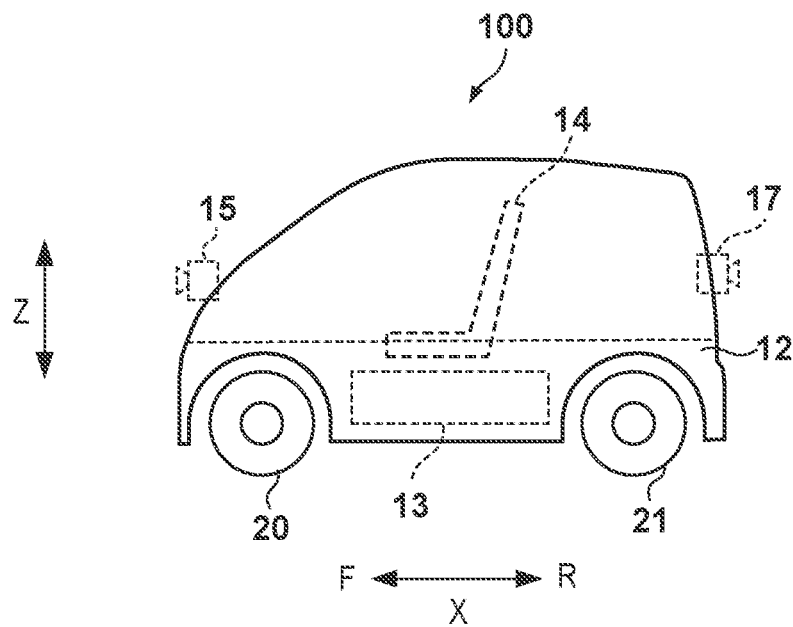
FIGS. 2A and 2B are block diagrams showing a configuration example of hardware of a vehicle as an example of a moving body according to the present embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Configuration of Information Processing System)

A configuration of an information processing system 1 according to the present embodiment will be described with reference to FIG. 1. The information processing system 1 includes a vehicle 100, a server 110, and a communication device 120.

The vehicle 100 is an example of a moving body capable of autonomous movement, and is, for example, an ultra-compact mobility that is mounted with a battery and moves mainly by the power of a motor. The ultra-compact mobility is an ultra-compact vehicle that is more compact than a general automobile and has a riding capacity of about one or two persons. In the present embodiment, the vehicle 100 is, for example, a four-wheeled vehicle. In the following embodiment, the moving body is not limited to a vehicle, may include such a compact mobility that carries baggage in parallel with a walking user or leads a person, and may include another moving body (for example, an ambulatory robot) capable of autonomous movement.

The vehicle 100 is connected to a network 140 via wireless communication such as Wi-Fi or 5th generation mobile communication, for example. The vehicle 100 can measure states inside and outside the vehicle (such as a position of the vehicle, a traveling state, and a target of a surrounding object) by various sensors and transmit measured data to the server 110. The data collected and transmitted in this manner is also generally referred to as floating data, probe data, traffic information, or the like. The information on the vehicle is transmitted to the server 110 at regular intervals or in response to an occurrence of a specific event. The vehicle 100 can travel by automated driving even in a case where a user 130 is not in the vehicle. The vehicle 100 receives information such as a control command provided from the server 110 or controls operation of the vehicle using data measured by the self-vehicle.

The server 110 includes one or more server devices, acquires information on the vehicle transmitted from the vehicle 100 and utterance information and position information transmitted from the communication device 120 via a network 111, and can control traveling of the vehicle 100. A traveling control of the vehicle 100 includes processing of adjusting a meeting position of the user 130 and the vehicle 100 described later.

Although the communication device 120 is, for example, a smartphone, the present invention is not limited thereto, and the communication device 120 may be an earphone-type communication terminal, a personal computer, a tablet terminal, a game machine, or the like. The communication device 120 is connected to the network 140 via wireless communication such as Wi-Fi or 5th generation mobile communication, for example.

The network 111 includes, for example, a communication network such as the Internet or a mobile telephone network, and transmits information between the server 110 and the vehicle 100 or the communication device 120.

In the information processing system 1, in a case where the user 130 and the vehicle 100 located at distant places approach each other to such an extent that a target or the like (serving as a visual mark) can be visually confirmed, the meeting position is adjusted using the utterance information and image information captured by the vehicle 100.

Before the user 130 and the vehicle 100 approach each other to the extent that the target or the like can be visually confirmed, first, the server 110 moves the vehicle 100 to a rough area including a current position of the user or a predicted position of the user. Then, when the vehicle 100 reaches the rough area, the server 110 transmits, to the communication device 120, utterance information (for example, "Is there a store nearby?") asking for a place related to a visual mark. The place related to the visual mark includes, for example, a name of a place included in map information. The server 110 receives, from the communication device 120, the utterance information (for example, "There is a building of xx coffee shop") including the place related to the visual mark. Then, the server 110 acquires a position of a corresponding place from the map information, and moves the vehicle 100 to the vicinity of the place (that is, the vehicle and the user approach each other to the extent that the target or the like can be visually confirmed).

(Vehicle Configuration)

Next, a configuration of the vehicle 100 as an example of the vehicle according to the present embodiment will be described with reference to FIGS. 2A and 2B.

Figure 2B:
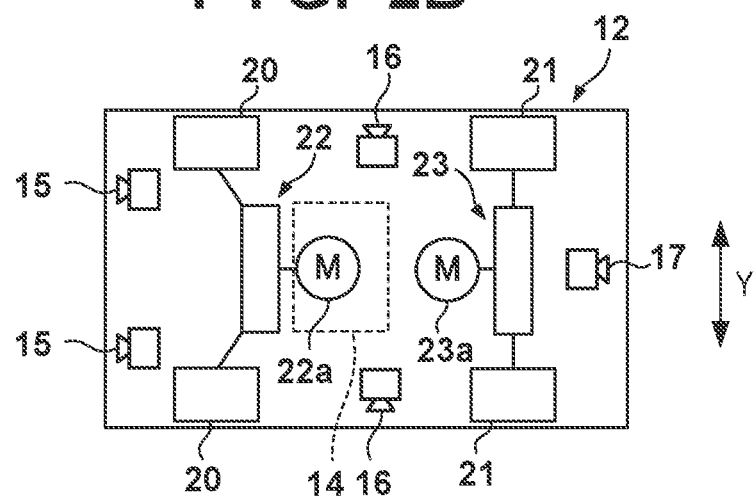

FIG. 2A illustrates a side surface of the vehicle 100 according to the present embodiment, and FIG. 2B illustrates an internal configuration of the vehicle 100. In the drawings, an arrow X indicates a front-and-rear direction of the vehicle 100, F indicates the front, and R indicates the rear. Arrows Y and Z indicate a width direction (left-right direction) and a vertical direction of the vehicle 100.

The vehicle 100 is an electric autonomous vehicle including a traveling unit 12 and using a battery 13 as a main power supply. The battery 13 is, for example, a secondary battery such as a lithium ion battery, and the vehicle 100 moves itself with the traveling unit 12 using electric power supplied from the battery 13. The traveling unit 12 is a four-wheeled vehicle including a pair of left and right front wheels 20 and a pair of left and right rear wheels 21. The traveling unit 12 may be in another form such as a form of a tricycle. The vehicle 100 includes a seat 14 for one person or two persons.

The traveling unit 12 includes a steering mechanism 22. The steering mechanism 22 is a mechanism that changes a steering angle of the pair of front wheels 20 using a motor 22a as a drive source. The traveling direction of the vehicle 100 can be changed by changing the steering angle of the pair of front wheels 20. The traveling unit 12 also includes a drive mechanism 23. The drive mechanism 23 is a mechanism that rotates the pair of rear wheels 21 using a motor 23a as a drive source. The vehicle 100 can be moved forward or backward by rotating the pair of rear wheels 21.

The vehicle 100 includes detection units 15 to 17 that detect a target around the vehicle 100. The detection units 15 to 17 are a group of external sensors that monitors the surroundings of the vehicle 100, and in a case of the present embodiment, each of the detection units 15 to 17 is an imaging device that captures an image of the surroundings of the vehicle 100, and includes, for example, an optical system such as a lens and an image sensor. However, instead of or in addition to the imaging device, a radar or light detection and ranging (LiDAR) can also be adopted.

The two detection units 15 are arranged in a front portion of the vehicle 100 while spaced apart from each other in a Y direction, and mainly detect a target in front of the vehicle 100. The detection unit 16 is disposed in each of a left side portion and a right side portion of the vehicle 100, and mainly detects a target on a side of the vehicle 100. The detection unit 17 is disposed in a rear potion of the vehicle 100, and mainly detects a target behind the vehicle 100.

Figure 3:
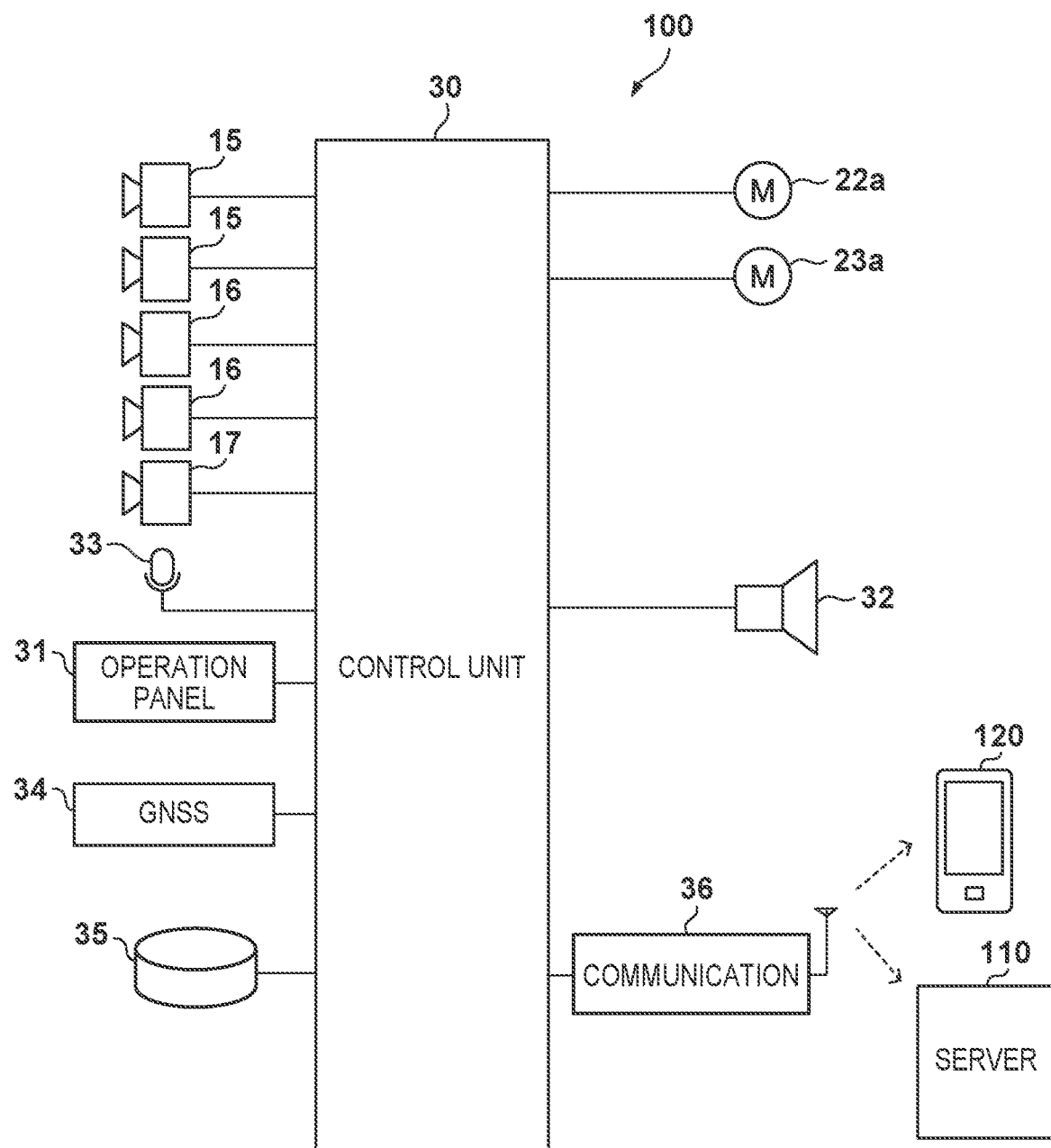
FIG. 3 is a block diagram showing a functional configuration example of the vehicle according to the present embodiment.

FIG. 3 is a block diagram of a control system of the vehicle 100. The vehicle 100 includes a control unit (ECU) 30. The control unit 30 includes a processor represented by a central processing unit (CPU), a storage device such as a semiconductor memory, an interface with an external device, and the like. In the storage device, programs executed by the processor, data used for processing by the processor, and the like are stored. A plurality of sets of the processors, the storage devices, and the interfaces may be provided for each function of the vehicle 100 so as to be able to communicate with each other.

The control unit 30 acquires a detection result of the detection units 15 to 17, input information of an operation panel 31, voice information input from a voice input device 33, a control command (for example, transmission of a captured image or a current position, or the like) from the server 110, and the like, and executes corresponding processing. The control unit 30 performs control of the motors 22a and 23a (traveling control of the traveling unit 12), display control of the operation panel 31, notification to an occupant of the vehicle 100 by voice, and output of information.

The voice input device 33 collects a voice of the occupant of the vehicle 100. The control unit 30 can recognize an input voice and execute corresponding processing. A global navigation satellite system (GNSS) sensor 34 receives a GNSS signal and detects the current position of the vehicle 100.

A storage apparatus 35 is a mass storage device that stores the map data and the like including information on a road on which the vehicle 100 can travel, a landmark such as a building, a store, and the like. The storage apparatus 35 may also store programs executed by the processor, data used for processing by the processor, and the like. The storage apparatus 35 may store various parameters (for example, trained parameters of a deep neural network, hyperparameters, and the like) of a machine learning model for voice recognition and image recognition executed by the control unit 30.

The communication device 36 is, for example, a communication device that can be connected to the network 140 via wireless communication such as Wi-Fi or 5th generation mobile communication.

(Configuration of Server)

Figure 4:
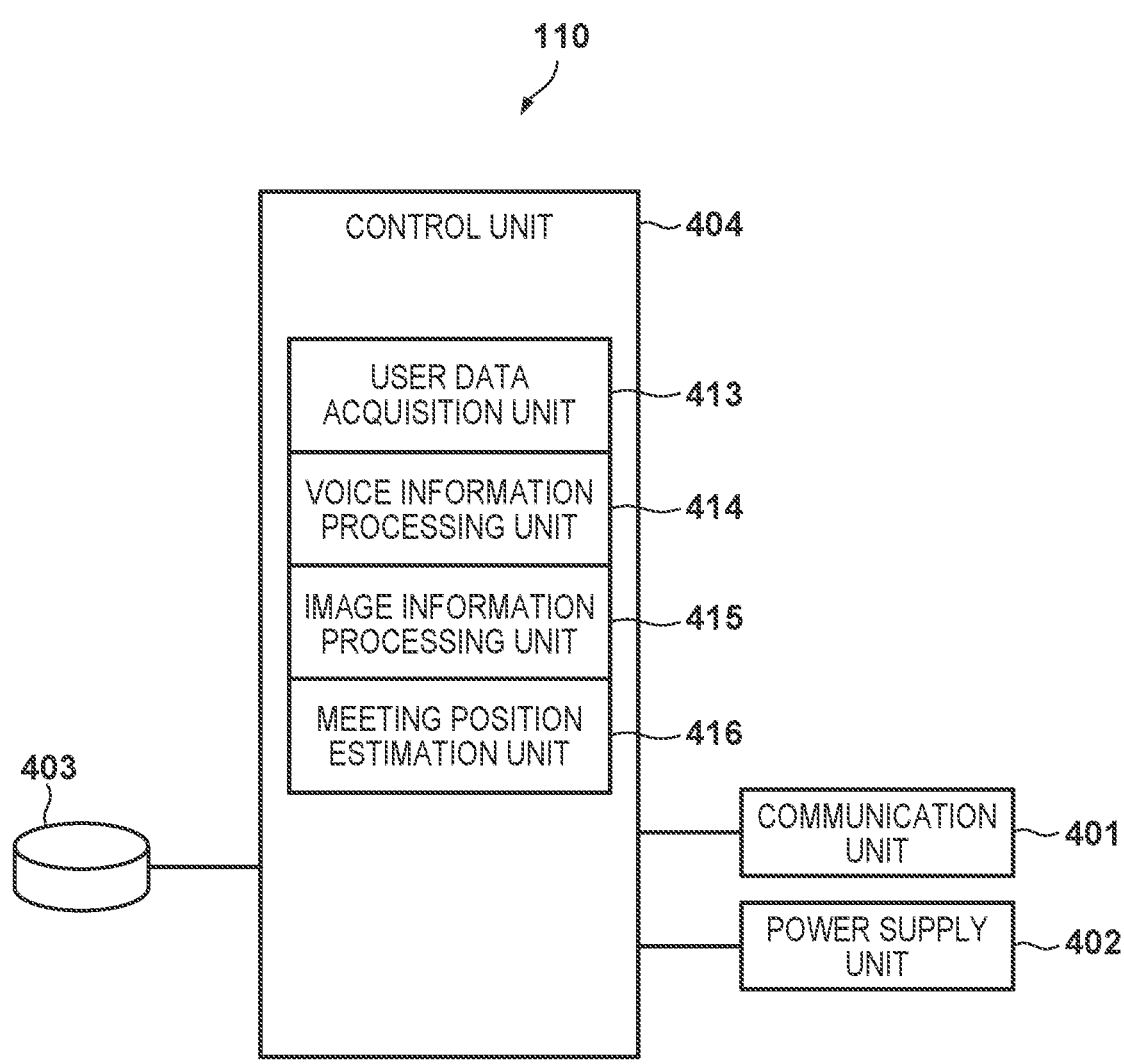
FIG. 4 is a block diagram showing a functional configuration example of a server as an example of an information processing apparatus according to the present embodiment.

Next, a configuration of the server 110 as an example of an information processing apparatus according to the present embodiment will be described with reference to FIG. 4.

The control unit 404 includes a processor represented by a CPU, a storage device such as a semiconductor memory, an interface with an external device, and the like. In the storage device, programs executed by the processor, data used for processing by the processor, and the like are stored. The plurality of sets of processors, storage devices, and interfaces may be provided for each function of the server 110 so as to be able to communicate with each other. The control unit 404 executes the programs to execute various operations of the server 110, the processing of adjusting a meeting position described later, and the like. In addition to the CPU, the control unit 404 may further include a graphical processing unit (GPU) or dedicated hardware suitable for executing processing of a machine learning model such as a neural network.

A user data acquisition unit 413 acquires information on an image and a position transmitted from the vehicle 100. Furthermore, the user data acquisition unit 413 acquires the utterance information of the user 130 transmitted from the communication device 120. The user data acquisition unit 413 may store the acquired image and position information in a storage unit 403. The information on the image and the utterance acquired by the user data acquisition unit 413 is input to a trained model in an inference stage in order to obtain an inference result, but may be used as training data for training the machine learning model to be executed by the server 110.

A voice information processing unit 414 includes the machine learning model that processes the voice information, and executes processing of a learning stage and processing of the inference stage of the machine learning model. The machine learning model of the voice information processing unit 414 performs, for example, computation of a deep learning algorithm using a deep neural network (DNN) to recognize a place name, a name of a landmark such as a building, a store name, a target name, and the like included in the utterance information. The target may include a pedestrian, a signboard, a sign, equipment installed outdoors such as a vending machine, building components such as a window and an entrance, a road, a vehicle, a two-wheeled vehicle, and the like included in the utterance information.

The DNN is enters a trained state as a result of performing the processing of the learning stage, and can perform recognition processing (processing of the inference stage) for new utterance information by the new utterance information being inputted to the trained DNN. In the present embodiment, although a case where the server 110 executes voice recognition processing will be described as an example, the voice recognition processing may be executed in the vehicle or the communication device, and a recognition result may be transmitted to the server 110.

An image information processing unit 415 includes the machine learning model that processes the image information, and executes processing of the learning stage and processing of the inference stage of the machine learning model. For example, the machine learning model of the image information processing unit 415 performs processing of recognizing a target included in the image information by performing operation of the deep learning algorithm using the DNN. The target may include a pedestrian, a signboard, a sign, equipment installed outdoors such as a vending machine, building components such as a window and an entrance, a road, a vehicle, a two-wheeled vehicle, and the like included in the image.

A meeting position estimation unit 416 executes meeting position adjustment processing described later. The meeting position adjustment processing will be described later.

The server 110 can generally use more abundant computational resources than the vehicle 100 or the like. In addition, it is possible to collect training data under a wide variety of circumstances by receiving and accumulating data on images captured by various vehicles, so that it is possible to perform learning that responds to a wider variety of circumstances.

The communication unit 401 is a communication device including, for example, a communication circuit and the like, and communicates with an external device such as the vehicle 100 or the communication device 120. The communication unit 401 receives the image information and the position information from the vehicle 100 and the utterance information from the communication device 120, and also transmits the control command to the vehicle 100 and the utterance information to the communication device 120.

A power supply unit 402 supplies electric power to each unit in the server 110. The storage unit 403 is a nonvolatile memory such as a hard disk or a semiconductor memory.

(Outline of Meeting Position Estimation Using Utterance and Image)

Figure 5A:
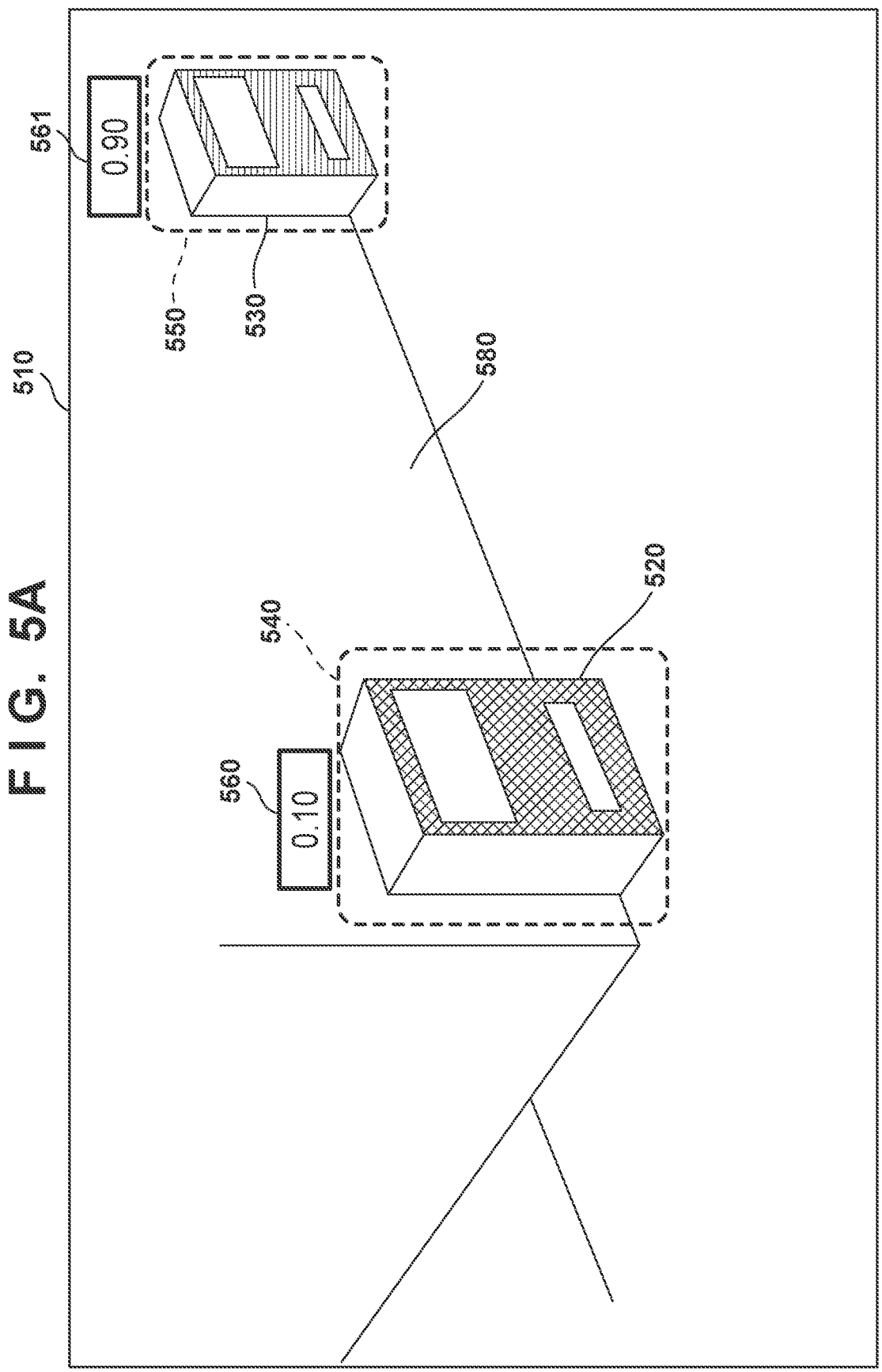
FIG. 5A is a diagram (1) for explaining estimation of a meeting position using an utterance and an image according to the present embodiment.
Figure 5B:
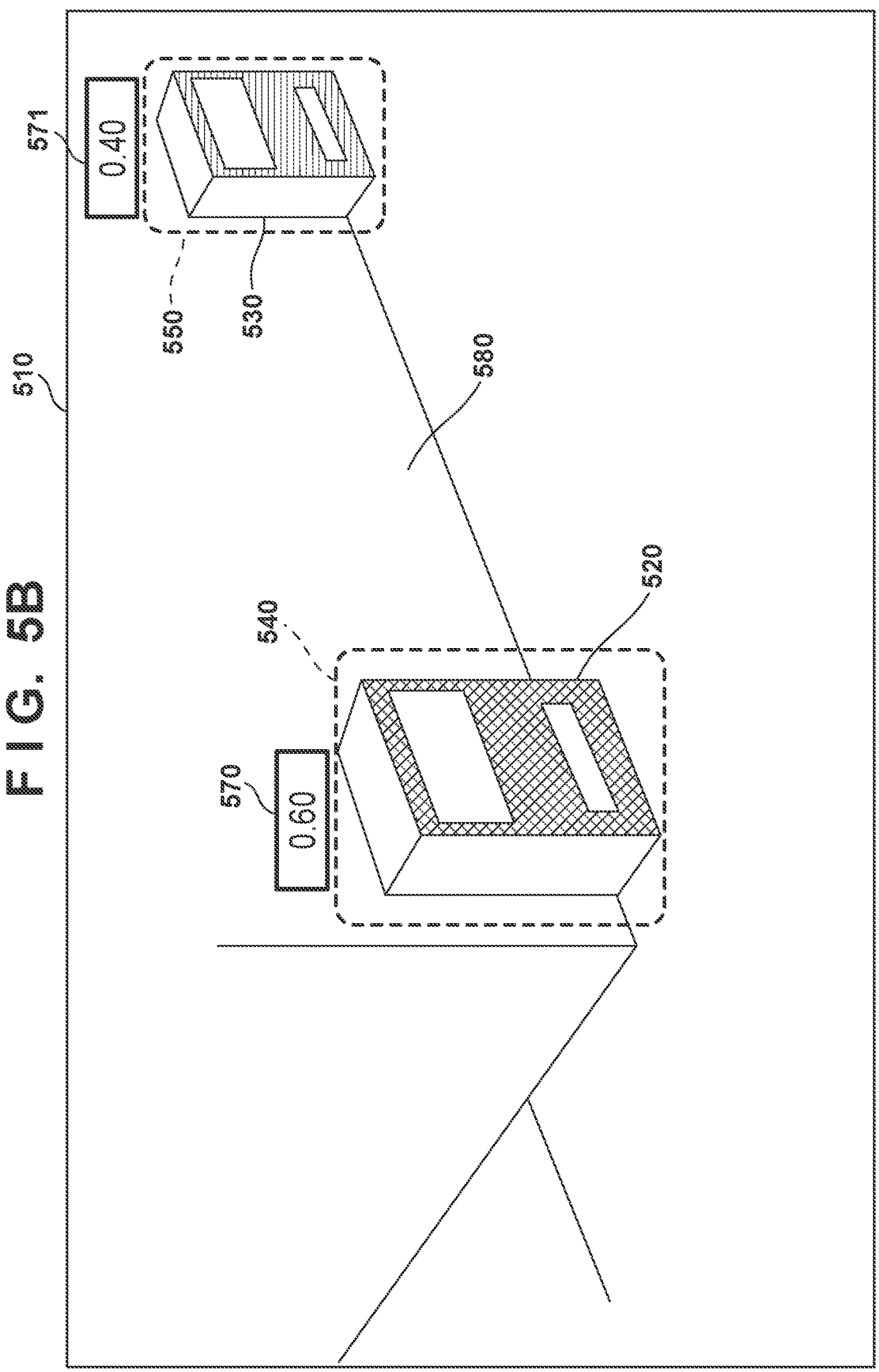
FIG. 5B is a diagram (2) for explaining estimation of the meeting position using the utterance and the image according to the present embodiment.

With reference to FIGS. 5A and 5B, an outline of meeting position estimation using the utterance and the image and executed in the server 110 will be described. As described above, this processing is executed after the user 130 and the vehicle 100 located at distant places approach each other to the extent that a target or the like (serving as a visual mark) can be visually confirmed.

FIG. 5A schematically illustrates an example of a result of the server 110 estimating the meeting position intended by the user for an image 510 captured by the vehicle 100.

The image 510 is an image of a front side situation captured by the vehicle 100. In the image 510, a vending machine 520 and a vending machine 530 installed in front of a building 580 are captured. For example, the vending machine 520 is a red vending machine, and the vending machine 530 is a blue vending machine.

For example, there is considered a case where the user 130 utters "stop in front of the blue vending machine". The server 110 extracts a visual mark from the utterance information. The visual mark is, for example, a vending machine. The server 110 recognizes the vending machine from the image information, and identifies a region of the recognized vending machine. In the example shown in FIG. 5A, it is shown that a region of the red vending machine 520 is identified as 540 and a region of the blue vending machine 530 is identified as 550.

The server 110 calculates a probability distribution corresponding to the visual mark for the identified region. In this example, since the visual mark is the vending machine, the probability distribution in which a probability for each "vending machine" can be obtained is calculated. At this time, since a blue visual mark is only the vending machine 530, for example, the probability distribution in which the probability of the blue vending machine 530 is "0.90" and the probability of the red vending machine 520 is "0.10" is given. The setting of the probability distribution described here is an example, and other probability distributions may be set. For example, the "blue vending machine" may be extracted as the visual mark, and only the region of the blue vending machine 530 may be identified to give a maximum probability only to this region.

FIG. 5B schematically illustrates another example of the result of the server 110 estimating the meeting position intended by the user for the image 510 captured by the vehicle 100. In the example illustrated in FIG. 5B, there is considered a case where the user 130 utters "stop in front of the vending machine". The server 110 recognizes the vending machine from the image information, and identifies a region of the recognized vending machine. The region of the red vending machine 520 is identified as 540, and the region of the blue vending machine 530 is identified as 550. For example, the server 110 can calculate the probability distribution in which both the red vending machine 520 and the blue vending machine 530 have the same probability (for example, 0.5). At this time, if the red vending machine 520 is closer to the current position of the user 130 (communication device 120), the server 110 may correct the probability distribution so that the probability of the red vending machine 520 is "0.6" and the probability of the blue vending machine 530 is "0.4". In this case, although a relatively high probability (for example, "0.3" or more) is given to all of the vending machines, the probability does not exceed a predetermined threshold (for example, 0.9) by which one of the vending machines can be specified. Therefore, the server 110 transmits additional utterance information (for example, "Red vending machine?") for narrowing down the visual mark to the communication device 120. The server 110 repeats reception of the utterance information from the user and transmission of the additional utterance information to specify one visual mark. When the server 110 specifies one visual mark, the server 110 estimates that the front of the specified mark is the meeting position, and moves the vehicle 100 to the place to meet with the user.

(Series of Operations of Meeting Position Adjustment Processing)

Figure 6:
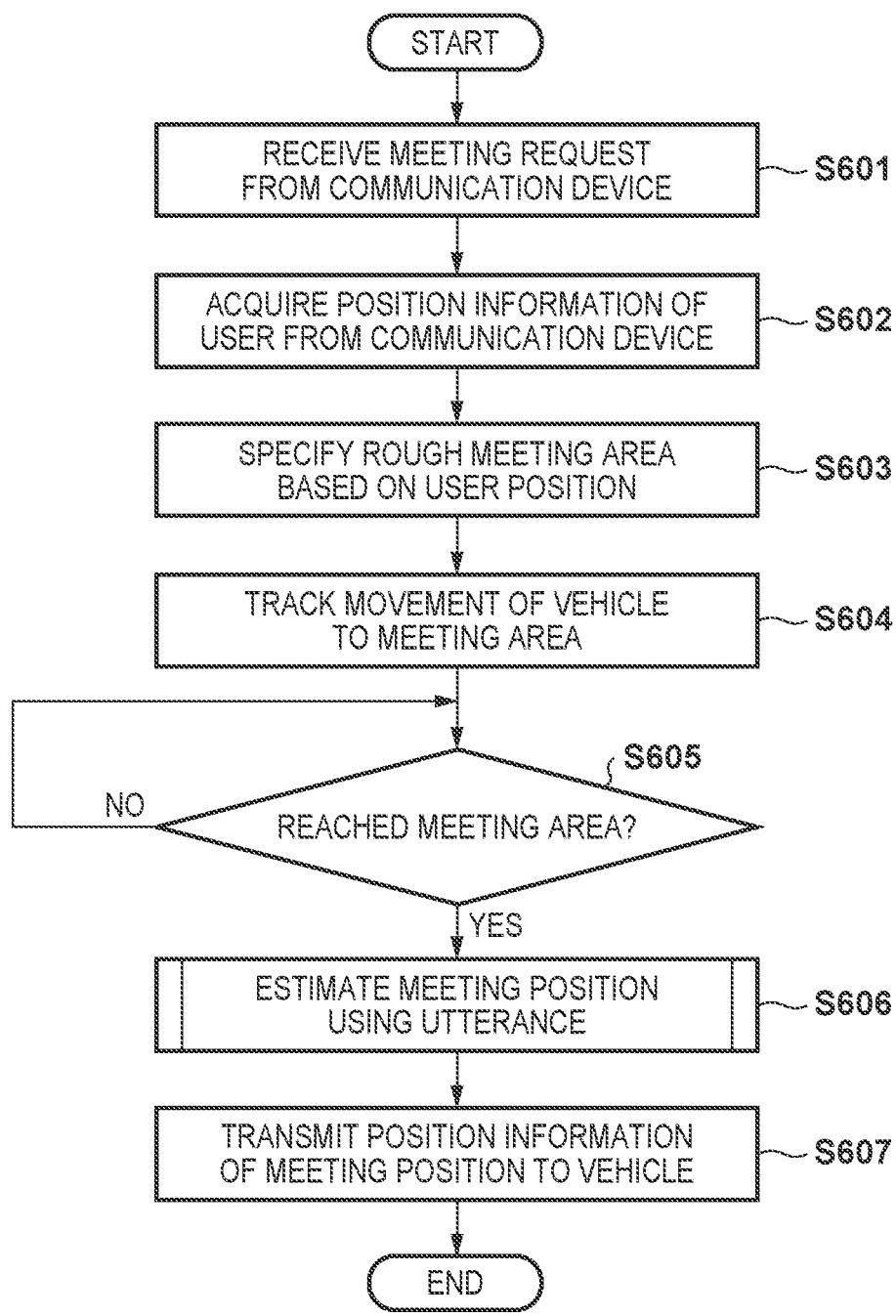
FIG. 6 is a flowchart showing a series of operation of meeting position adjustment processing according to the present embodiment.

Next, a series of operations of the meeting position adjustment processing in the server 110 will be described with reference to FIG. 6. The present processing is achieved by the control unit 404 performing a program. In the following description, although it is assumed that the control unit 404 executes each processing for the sake of simplicity of description, corresponding processing is executed by each unit of the control unit 404 (described above with reference to FIG. 4).

In S601, the control unit 404 receives a request (meeting request) for starting meeting with the vehicle 100 from the communication device 120. In S602, the control unit 404 acquires a position information of the user from the communication device 120. The position information of the user is position information of the communication device 120. In S603, the control unit 404 specifies a rough area for meeting (also simply referred to as a meeting area) based on the position of the user acquired in S602. The meeting area is, for example, an area centered on the current position of the user 130 (communication device 120) having a radius of a predetermined distance (for example, several hundred meters).

In S604, for example, the control unit 404 tracks the movement of the vehicle 100 toward the meeting area based on the position information periodically transmitted from the vehicle 100. For example, the control unit 404 can select the vehicle closest to the current position (or an arrival point after a predetermined time) of the user 130 as the vehicle 100 meeting with the user 130. Alternatively, in a case where information designating the specific vehicle 100 is included in the meeting request, the control unit 404 may select the vehicle 100 as the vehicle 100 meeting with the user 130.

In S605, the control unit 404 determines whether the vehicle 100 has reached the meeting area. For example, in a case where a distance between the vehicle 100 and the communication device 120 is within a radius of the meeting area, the control unit 404 determines that the vehicle 100 has reached the meeting area, and advances the processing to S606. Otherwise, the server returns the processing to S605 to wait for the vehicle 100 to reach the meeting area.

In S606, the control unit 404 executes the meeting position estimation processing using the utterance. Details of the meeting position estimation processing using the utterance will be described later.

In S607, the control unit 404 transmits the position information of the meeting position to the vehicle. That is, the control unit 404 moves the vehicle 100 to the meeting position by transmitting the meeting position estimated in the processing of S606 to the vehicle 100. After transmitting the meeting position to the vehicle 100, the control unit 404 terminates the series of operations.

(Series of Operations of Meeting Position Estimation Processing Using Utterance)

Figure 7:
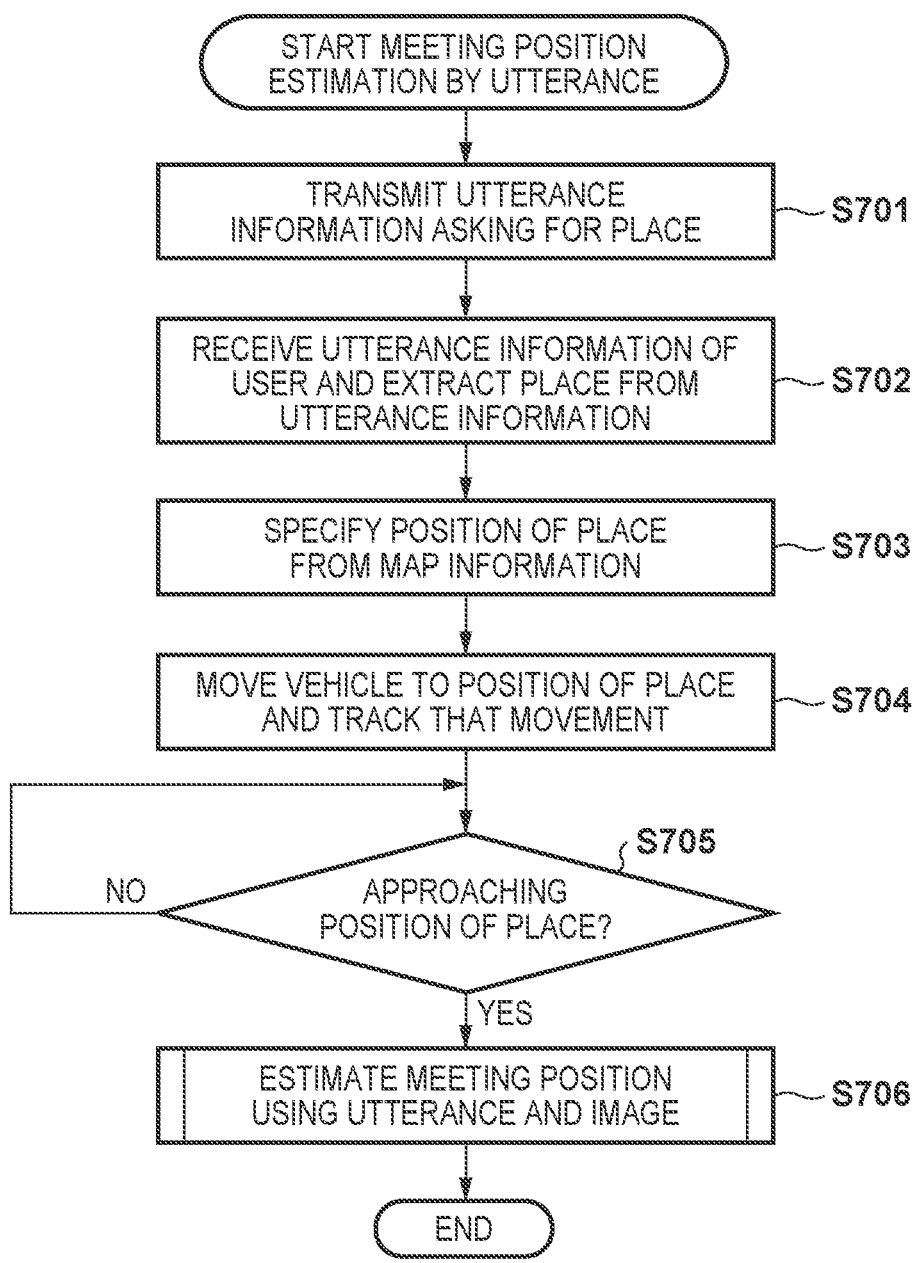
FIG. 7 is a flowchart showing a series of operation of the meeting position adjustment processing using the utterance according to the present embodiment.

In addition, a series of operations of the meeting position estimation processing using the utterance in the server 110 will be described with reference to FIG. 7. The present processing is achieved by the control unit 404 performing a program, similarly to the processing illustrated in FIG. 6.

In S701, the control unit 404 transmits the utterance information asking about "the place related to the visual mark" to the communication device 120. The utterance information asking about the place related to the visual mark includes, for example, an utterance such as "Is there a store nearby?" The utterance information asking about the place related to the visual mark may be information determined in advance and stored in the storage unit 403.

In S702, the control unit 404 receives the utterance information of the user from the communication device 120, recognizes the utterance content, and extracts information on the place included in the utterance content. At this time, the utterance information of the user includes information on the place related to the visual mark, such as "There is a building of xx coffee shop".

In S703, the control unit 404 specifies the position of the place extracted in S702 from the map information. For example, the "xx coffee shop" is searched from the map information in the meeting area, and the position of the place is specified.

In S704, the control unit 404 transmits the position of the place (related to the visual mark) specified from the map information, to the vehicle 100, and moves the vehicle 100 to the position of the place. Furthermore, the control unit 404 tracks the movement of the vehicle to the position of the place.

In S705, the control unit 404 determines whether the vehicle 100 has approached the position of the place. For example, in a case where the control unit 404 determines that the vehicle 100 has approached within a predetermined distance from the position of the place related to the visual mark, the processing proceeds to S706, and otherwise, the processing of S705 is repeated. Here, the predetermined distance is a distance at which a target or the like serving as the visual mark can be visually confirmed.

In S706, the control unit 404 estimates the meeting position using the utterance information and the image information. Details of this processing will be described later. After terminating the processing of this step, the control unit 404 terminates the series of operations and returns to a call source.

(Series of Operations of Meeting Position Estimation Processing Using Utterance and Image Information)

Figure 8:
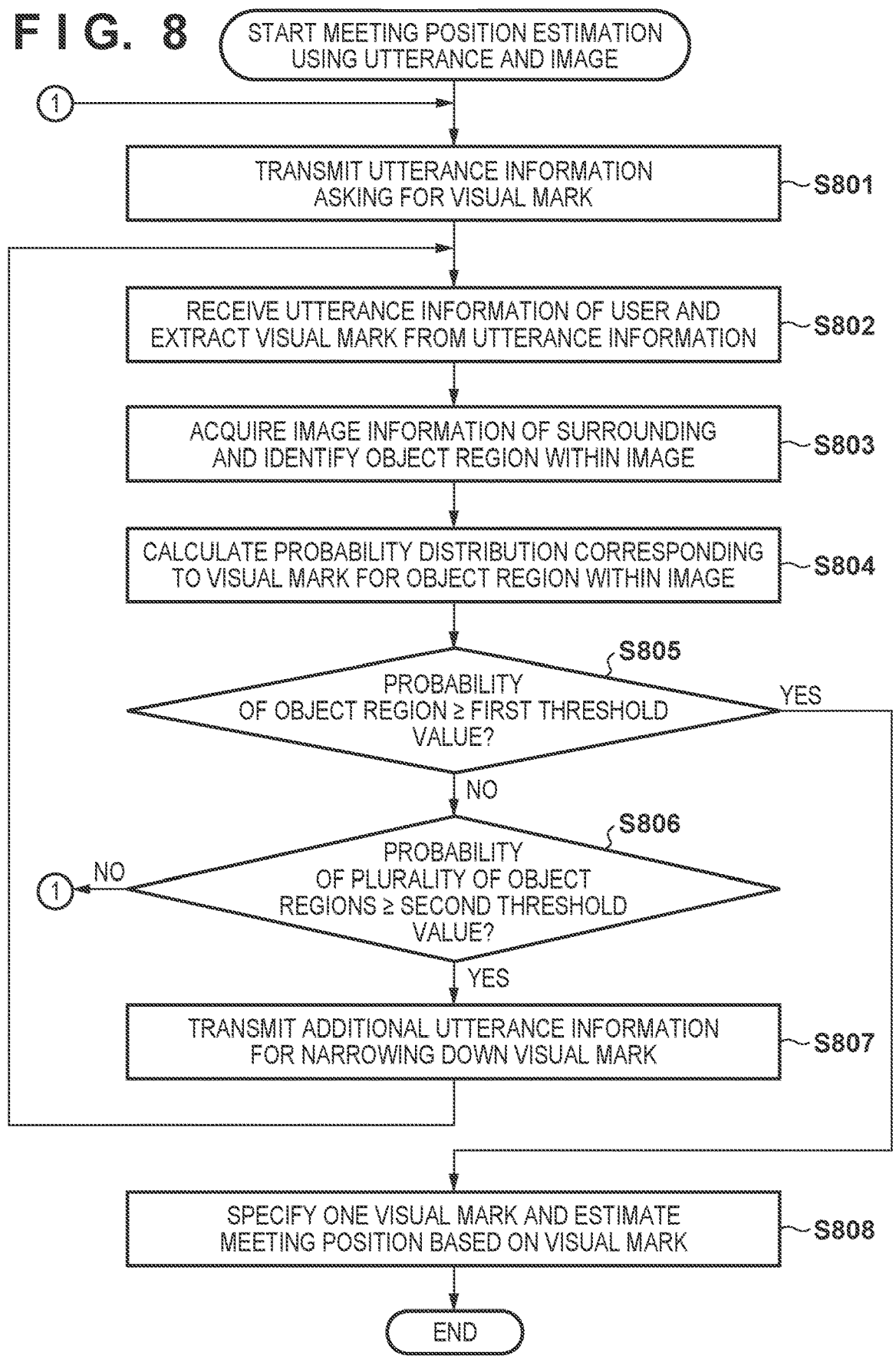
FIG. 8 is a flowchart showing a series of operation of the meeting position adjustment processing using the utterance and the image according to the present embodiment.

In addition, a series of operations of the meeting position estimation processing using the utterance and the image information in the server 110 will be described with reference to FIG. 8. The present processing is achieved by the control unit 404 performing a program, similarly to FIGS. 6 and 7.

In S801, the control unit 404 transmits the utterance information asking about the visual mark. For example, utterance information such as "What is the mark of the meeting point?" is transmitted to the communication device 120.

In S802, the control unit 404 receives the utterance information of the user, recognizes the utterance content, and extracts information on the visual mark from the recognized utterance content. The visual mark is, for example, the "vending machine" described above. In S803, the control unit 404 instructs the vehicle 100 to transmit the image information of the surroundings (for example, the front), and acquires the image information obtained by capturing the surroundings of the vehicle 100. The control unit 404 performs object recognition on the acquired image to identify an object region in the image (corresponding to the visual mark).

In S804, the control unit 404 calculates the probability distribution indicating a probability corresponding to the visual mark for one or more object regions in the image. For example, in a case where the mark included in the utterance information is a "vending machine" and there are two or more regions of the "vending machine" in the image, the control unit 404 may calculate the probability distribution of the object region based on a limited linguistic element (for example, "blue") of the utterance content. In this case, for example, the probability distribution in which the probability of the blue vending machine 530 is "0.90" and the probability of the red vending machine 520 is "0.10" may be calculated.

In a case where the mark included in the utterance information is the "vending machine" and there are two or more regions of the "vending machine" in the image, the same probability can be given to both object regions. At this time, as illustrated in FIG. 5B, the server 110 may further vary the probability distribution according to a relative positional relationship between the target serving as the visual mark and the user 130. If the red vending machine 520 is closer to the current position of the user 130 (communication device 120), the server 110 may correct the probability distribution so that the probability of the red vending machine 520 is "0.6" and the probability of the blue vending machine 530 is "0.4". It is possible to provide the probability distribution in which the probability increases in the order in which the vending machine can become a candidate when viewed from a direction in which the user approaches.

In a case where the utterance information includes a positional relationship with an object such as "a vending machine on the left side of a building", the control unit 404 may calculate the probability distribution in consideration of a relative positional relationship as viewed from the vehicle 100. For example, the probability of the region of the vending machine 520 on the left side of the building 580 may be calculated as "0.9", and the probability of the region of the vending machine 530 on the right side of the building 580 may be calculated as "0.1".

Alternatively, in a case where the utterance information is "a vending machine near a building", that is, in a case where the utterance information includes types of a plurality of objects (targets), and each type is recognized by a separate model, a conditional probability using the probability distribution of each object may be calculated. By calculating the conditional probability, the probabilities for each model can be easily combined even in a case where different models are used for each type of the object.

In a case where the probability distribution of a user position is further considered, the probability distribution corresponding to the visual mark for utterance information such as "(I am) near xx" can be calculated as the conditional probability of the probability distribution of the user position and the probability distribution for the region in the image. As described above, the probability distributions of the objects estimated from the models having different properties, such as the probability distribution of the user position and the probability distribution for the object region, can be easily combined.

In S805, the control unit 404 determines whether the probability of the object region calculated in S804 is greater than or equal to a first threshold. In a case where there is the object region having a probability greater than or equal to the first threshold, the processing proceeds to S808, and otherwise, the processing proceeds to S806.

In S806, the control unit 404 determines whether the probability corresponding to the visual mark for two or more object regions is greater than or equal to a second threshold. Here, the case where the determination is YES corresponds to the case illustrated in FIG. 5B where although a relatively high probability (for example, "0.3" or more) is given to any of the vending machines, the probability does not exceed the first threshold (for example, 0.9) by which one of the vending machines can be specified. The second threshold corresponds to, for example, 0.3 in this example. In a case where the determination is YES, the control unit 404 advances the processing to S807, and otherwise, the control unit 404 returns the processing to S801 to obtain a more effective visual mark.

In S807, the control unit 404 transmits the additional utterance information for narrowing down the visual mark, such as "Red vending machine?", for example. In a case where the visual mark cannot be narrowed down to one mark in the relationship between the utterance information of the user 130 and the image information of the vehicle 100, it is possible to reduce ambiguity of the visual mark by obtaining the additional utterance information from the user.

In S808, the control unit 404 specifies the object region having a probability greater than or equal to the first threshold as the object region corresponding to the visual mark, and estimates the meeting position based on the specified object region. For example, the control unit 404 acquires a self-position of the vehicle 100 and estimates a distance from the self-position to the specified object region in the image. At this time, a known technique can be used to measure the distance from the vehicle to a specific object in the image. The control unit 404 calculates the position of the object corresponding to the object region based on the self-position and the distance to the object, and estimates the meeting position based on the position of the object. At this time, the meeting position is estimated in consideration of the relative positional relationship from the vehicle 100. For example, in the example in which the utterance information of the user is "in front of the blue vending machine" in the image 510 illustrated in FIG. 5A, the meeting position is estimated as a near side as viewed from the vehicle 100 with respect to the position of the blue vending machine. The control unit 404 then terminates the series of operations and returns to a call source.

The above embodiment is not limited to the case where the user and the vehicle meet, and can be applied to various movement instructions given by the user to the vehicle. That is, the above-described meeting position estimation with respect to the vehicle is an example of processing of estimating an instruction position with respect to the vehicle. The estimation of the instruction position with respect to the vehicle can also be applied to designation of the instruction position such as a standby instruction such as "I'll go get some coffee, so wait next to the post box there" or a movement destination instruction such as "receive a package at the counter over there". That is, the server can receive the utterance information regarding the instruction position including the visual mark and estimate the instruction position.

As described above, in the present embodiment, in the server that estimates the instruction position for the moving body (for example, the vehicle) used by the user, the utterance information regarding the instruction position including the visual mark, from the communication device 120, and the captured image captured by the moving body are acquired. Then, the object region in the captured image corresponding to the visual mark included in the utterance information is determined, and the instruction position is estimated based on the determined object region. In this way, it is possible to estimate the instruction position for the moving body from the utterance information of the user who uses the moving body (for example, the vehicle).

(Modifications)

Figure 9:
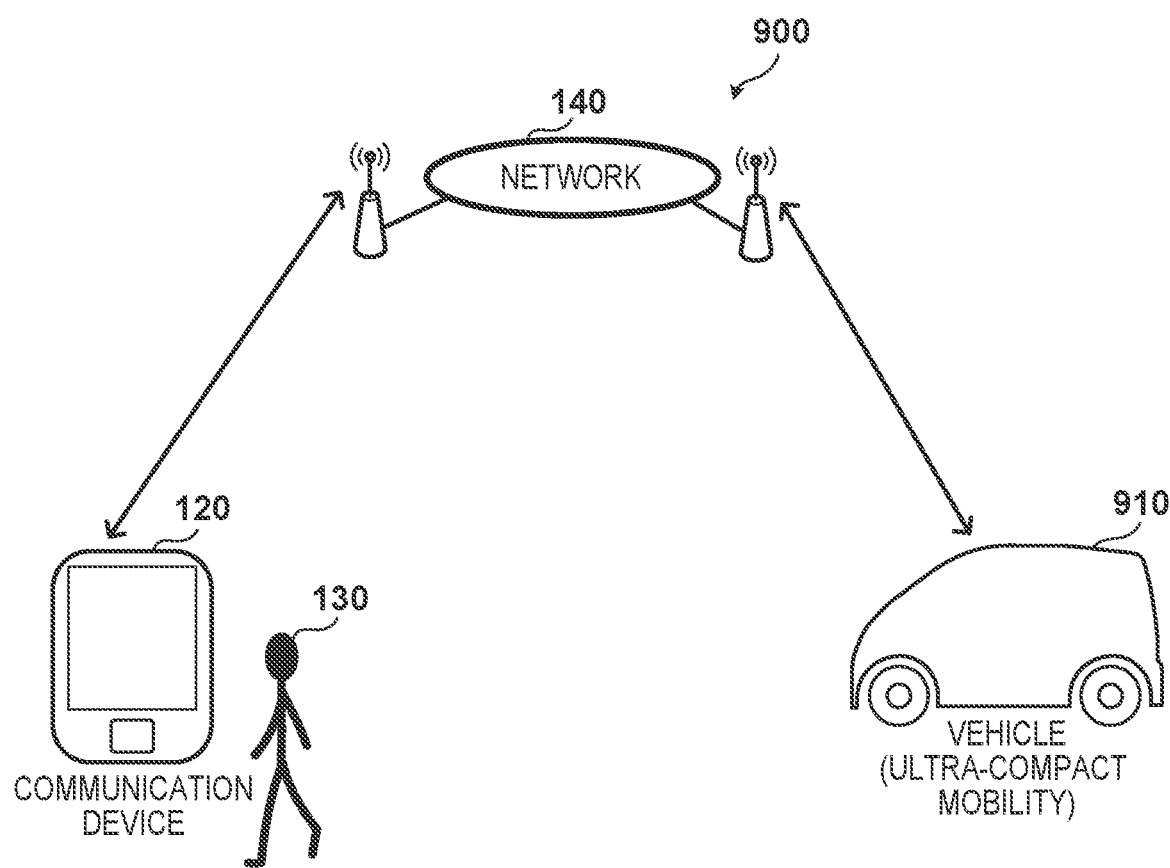
FIG. 9 is a diagram showing an example of an information processing system according to another embodiment.

Hereinafter, modifications according to the present invention will be described. In the above embodiment, the example in which the meeting position adjustment processing is executed in the server 110 has been described. However, the above-described meeting position adjustment processing can also be executed on the vehicle side. In this case, as illustrated in FIG. 9, an information processing system 900 includes a vehicle 910 which is an example of the moving body and the communication device 120. The utterance information of the user is transmitted from the communication device 120 to the vehicle 910. The image information captured by the vehicle 910 is processed by a control unit in the vehicle instead of being transmitted via a network. The configuration of the vehicle 910 may be the same as that of the vehicle 100 except that the control unit 30 can execute the meeting position adjustment processing. The control unit 30 of the vehicle 910 operates as a control apparatus in the vehicle 910, and executes the above-described meeting position adjustment processing by executing the stored program. Communication between the server and the vehicle in the series of operations illustrated in FIGS. 6 to 8 may be performed inside the vehicle (for example, inside the control unit 30 or between the control unit 30 and the detection unit 15). The other processing can be executed similarly to the server.

As described above, in the control apparatus for the moving body that estimates the instruction position for the moving body (for example, the vehicle) used by the user, the utterance information regarding the instruction position including the visual mark is acquired from the communication device, and the captured image captured by the moving body is acquired. Then, the object region in the captured image corresponding to the visual mark included in the utterance information is determined, and the instruction position is estimated based on the determined object region. In this way, it is possible to estimate the instruction position for the moving body from the utterance information of the user who uses the moving body.

Summary of Embodiment

1. An information processing apparatus (e.g., 110) according to the above embodiment is an information processing apparatus that estimates an instruction position for a moving body used by a user, the information processing apparatus comprising:

an utterance acquisition unit (e.g., 413) configured to acquire utterance information regarding the instruction position including a visual mark from a communication device used by the user;

an image acquisition unit (e.g., 413) configured to acquire a captured image captured by the moving body;

a determination unit (e.g., 414, 415, 416) configured to determine an object region in the captured image corresponding to the visual mark included in the utterance information; and an estimation unit (e.g., 416) configured to estimate the instruction position based on the object region determined by the determination unit.

According to this embodiment, it is possible to estimate the instruction position for the moving body from the utterance information of the user who uses the moving body (for example, in a case where the instruction position is adjusted between the user and the moving body (for example, ultra-compact mobility) or the standby instruction is given).

2. In the information processing apparatus according to the above embodiment, the determination unit calculates a probability distribution indicating a probability corresponding to the visual mark for one or more object regions recognized in the captured image, and determines the object region, having a probability equal to or greater than a first threshold, as the object region corresponding to the visual mark.

According to this embodiment, it is possible to accurately calculate a most likely object region corresponding to the mark included in the utterance information.

3. In the information processing apparatus according to the above embodiment, the determination unit transmits additional utterance information for narrowing down the visual mark to the communication device of the user in a case where the probability corresponding to the visual mark for two or more object regions is greater than or equal to a second threshold and smaller than the first threshold.

According to this embodiment, in a case where the visual mark cannot be narrowed down to one mark, it is possible to obtain the additional utterance information from the user. In addition, by obtaining the additional utterance information, it is possible to reduce ambiguity of the visual mark.

4. In the information processing apparatus according to the above embodiment, the determination unit calculates the probability corresponding to the visual mark for the two or more object regions according to a distance between each object in the two or more object regions and the communication device.

According to this embodiment, it is possible to give a higher probability in the order of likelihood of candidacy when viewed from the direction in which the user approaches.

5. In the information processing apparatus according to the above embodiment, in a case where the utterance information includes the visual mark of a different type, the determination unit calculates the probability distribution using a conditional probability.

According to this embodiment, the probabilities for each model can be easily combined even in a case where different models are used for each type of the object. The probability distributions of the objects estimated from the models having different properties can be easily combined.

6. In the information processing apparatus according to the above embodiment, in a case where utterance information including the instruction position includes an utterance indicating a positional relationship between the visual mark and another object, the determination unit calculates the probability distribution corresponding to the positional relationship with the other object for the one or more object regions.

According to this embodiment, it is possible to consider a relative positional relationship from the moving body.

7. In the information processing apparatus according to the above embodiment, the utterance acquisition unit further acquires the utterance information, including a place related to the visual mark, from the communication device before acquiring the utterance information regarding the instruction position including the visual mark.

According to this embodiment, it is possible to first approach a target point with information on a place as described in the map information, and then adjust the instruction position using visual information.

8. In the information processing apparatus according to the above embodiment, the utterance acquisition unit acquires the utterance information regarding the instruction position including the visual mark in response to the moving body approaching to be within a predetermined distance from a position of the place related to the visual mark.

According to this embodiment, it is possible to start estimation of the instruction position using the visual information triggered by having approached to be at a predetermined distance that enables visual confirmation of a target or the like serving as the visual mark.

9. In the information processing apparatus according to the above embodiment, the moving body is an ultra-compact mobility that is a vehicle having a riding capacity of one or two persons.

According to this embodiment, it is possible to perform the movement instruction using ultra-compact mobility that can be more easily used than a general passenger car.

10. The control apparatus (e.g., 30) for the moving body (for example, 910) according to the above embodiment is a moving body control apparatus that estimates an instruction position for a moving body used by a user, the moving body control apparatus including:

an utterance acquisition unit (e.g., 30) configured to acquire utterance information regarding the instruction position including a visual mark from a communication device (e.g., 120) used by the user;

an image acquisition unit (e.g., 30) configured to acquire a captured image captured by the moving body;

a determination unit (e.g., 30) configured to determine an object region in the captured image corresponding to the visual mark included in the utterance information; and an estimation unit (e.g., 30) configured to estimate the instruction position based on the object region determined by the determination unit.

According to this embodiment, it is possible to estimate the instruction position for the moving body from the utterance information of the user who uses the moving body (for example, in a case where the instruction position is adjusted between the user and the moving body (for example, ultra-compact mobility) or the standby instruction is given).

The invention is not limited to the foregoing embodiments, and various variations/changes are possible within the spirit of the invention.

What is claimed is:

1. An apparatus that estimates an instruction position for a moving body used by a user, the apparatus comprising:
   one or more processors; and
   a memory storing instructions which, when executed by the one or more processors, cause the one or more processors to:
   acquire vocal utterance information regarding the instruction position from a communication device used by the user, wherein the vocal utterance information includes a vocal utterance indicating a visual mark;
   acquire a captured image captured by the moving body;
   identify the visual mark in the vocal utterance information;
   determine an object region in the captured image, the object region corresponding to the visual mark identified in the vocal utterance information;
   estimate the instruction position based on the determined object region; and
   control the moving body to cause the moving body to move to the estimated instruction position to meet with the user,
   wherein the instructions cause the one or more processors to calculate a probability distribution indicating a probability corresponding to the visual mark for one or more object regions recognized in the captured image, and determine the object region, having a probability equal to or greater than a first threshold, as the object region corresponding to the visual mark, and
   wherein the instructions cause the one or more processors to transmit additional vocal utterance information for narrowing down the visual mark to the communication device of the user in a case where the probability corresponding to the visual mark for two or more object regions is greater than or equal to a second threshold and smaller than the first threshold.

2. The apparatus according to claim 1, wherein the instructions cause the one or more processors to calculate the probability corresponding to the visual mark for the two or more object regions according to a distance between each object in the two or more object regions and the communication device.

3. The apparatus according to claim 1, wherein in a case where the vocal utterance information includes the visual mark of a different type, the instructions cause the one or more processors to calculate the probability distribution using a conditional probability.

4. The apparatus according to claim 1, wherein in a case where vocal utterance information including the instruction position includes a vocal utterance indicating a positional relationship between the visual mark and another object, the instructions cause the one or more processors to calculate the probability distribution corresponding to the positional relationship with the other object for the one or more object regions.

5. The apparatus according to claim 1, wherein the instructions further cause the one or more processors to acquire the vocal utterance information, including a place related to the visual mark, from the communication device before acquiring the vocal utterance information regarding the instruction position including the visual mark.

6. The apparatus according to claim 5, wherein the instructions cause the one or more processors to acquire the vocal utterance information regarding the instruction position including the visual mark in response to the moving body approaching to be within a predetermined distance from a position of the place related to the visual mark.

7. The apparatus according to claim 1, wherein the moving body is an ultra-compact mobility that is a vehicle having a riding capacity of one or two persons.

8. A method of controlling an-apparatus that estimates an instruction position for a moving body used by a user, the method comprising:
   acquiring vocal utterance information regarding the instruction position from a communication device used by the user, wherein the vocal utterance information includes vocal utterance indicating a visual mark;
   acquiring a captured image captured by the moving body;
   identifying the visual mark in the vocal utterance information;
   determining an object region in the captured image, the object region corresponding to the visual mark identified in the vocal utterance information;
   estimating the instruction position based on the object region determined in the determining; and
   controlling the moving body to cause the moving body to move to the estimated instruction position to meet with the user,
   wherein the method further comprising:
   calculating a probability distribution indicating a probability corresponding to the visual mark for one or more object regions recognized in the captured image, and determining the object region, having a probability equal to or greater than a first threshold, as the object region corresponding to the visual mark, and
   transmitting additional vocal utterance information for narrowing down the visual mark to the communication device of the user in a case where the probability corresponding to the visual mark for two or more object regions is greater than or equal to a second threshold and smaller than the first threshold.

9. An apparatus for a moving body that estimates an instruction position for a moving body used by a user, the apparatus comprising:
   one or more processors; and
   a memory storing instructions which, when executed by the one or more processors, cause the one or more processors to:
   acquire vocal utterance information regarding the instruction position from a communication device used by the user, wherein the vocal utterance information includes vocal utterance indicating a visual mark;
   acquire a captured image captured by the moving body;
   identify the visual mark in the vocal utterance information;
   determine an object region in the captured image, the object region corresponding to the visual mark identified in the vocal utterance information;
   estimate the instruction position based on the determined object region; and
   control the moving body to cause the moving body to move to the estimated instruction position to meet with the user,
   wherein the instructions cause the one or more processors to calculate a probability distribution indicating a probability corresponding to the visual mark for one or more object regions recognized in the captured image, and determine the object region, having a probability equal to or greater than a first threshold, as the object region corresponding to the visual mark, and wherein the instructions cause the one or more processors to transmit additional vocal utterance information for narrowing down the visual mark to the communication device of the user in a case where the probability corresponding to the visual mark for two or more object regions is greater than or equal to a second threshold and smaller than the first threshold.

10. A method of controlling a moving body that estimates an instruction position for a moving body used by a user, the method comprising:

acquiring vocal utterance information regarding the instruction position from a communication device used by the user, wherein the vocal utterance information includes vocal utterance indicating a visual mark;

acquiring a captured image captured by the moving body;

identifying the visual mark in the vocal utterance information;

determining an object region in the captured image, the object region corresponding to the visual mark identified in the vocal utterance information;

estimating the instruction position based on the object region determined in the determining; and controlling the moving body to cause the moving body to move to the estimated instruction position to meet with the user, wherein the method further comprising:

calculating a probability distribution indicating a probability corresponding to the visual mark for one or more object regions recognized in the captured image, and determining the object region, having a probability equal to or greater than a first threshold, as the object region corresponding to the visual mark, and transmitting additional vocal utterance information for narrowing down the visual mark to the communication device of the user in a case where the probability corresponding to the visual mark for two or more object regions is greater than or equal to a second threshold and smaller than the first threshold.

11. An apparatus that estimates an instruction position for a moving body by a user, the apparatus comprising:

one or more processors; and a memory storing instructions which, when executed by the one or more processors, cause the one or more processors to:

acquire vocal utterance information regarding the instruction position including a visual mark from a communication device used by the user;

acquire a captured image captured by the moving body;

determine an object region in the captured image corresponding to the visual mark included in the vocal utterance information;

estimate the instruction position based on the object region determined; and control the moving body to cause the moving body to move to the estimated instruction position to meet with the user, wherein the instructions cause the one or more processors to transmit additional vocal utterance information for narrowing down the visual mark to the communication device of the user in a case where the probability corresponding to the visual mark for two or more object regions is greater than or equal to a second threshold and smaller than a first threshold.

* * * * *